United States Patent
Lewis et al.

(10) Patent No.: US 11,711,005 B2
(45) Date of Patent: Jul. 25, 2023

(54) VIBRATION-BASED ELECTRIC GENERATION DEVICE

(71) Applicants: Richard L Lewis, Chandler, AZ (US); Damon Kuhn, Needville, TX (US)

(72) Inventors: Richard L Lewis, Chandler, AZ (US); Damon Kuhn, Needville, TX (US)

(*) Notice: Subject to any disclaimer, the term of this patent is extended or adjusted under 35 U.S.C. 154(b) by 0 days.

(21) Appl. No.: 17/300,290

(22) Filed: May 12, 2021

(65) Prior Publication Data

US 2021/0359584 A1  Nov. 18, 2021

Related U.S. Application Data

(60) Provisional application No. 63/101,722, filed on May 12, 2020.

(51) Int. Cl.
| | | |
|---|---|---|
| H02K 35/02 | (2006.01) | |
| F03G 7/08 | (2006.01) | |
| B60G 13/14 | (2006.01) | |
| H02K 5/22 | (2006.01) | |

(52) U.S. Cl.
CPC ............ *H02K 35/02* (2013.01); *B60G 13/14* (2013.01); *F03G 7/08* (2013.01); *H02K 5/22* (2013.01); *H02K 2213/03* (2013.01)

(58) Field of Classification Search
CPC ...... H02K 35/02; H02K 5/22; H02K 2213/03; B60G 13/14; F03G 7/08
See application file for complete search history.

(56) References Cited

U.S. PATENT DOCUMENTS

| | | |
|---|---|---|
| 4,239,974 A | 12/1980 | Swander |
| 4,697,113 A | 9/1987 | Young |
| 4,754,157 A | 6/1988 | Windle |
| 4,950,931 A | 8/1990 | Goldenberg |
| 5,347,186 A | 9/1994 | Konotchick |
| 6,812,598 B2 | 11/2004 | Cheung et al. |
| 6,984,902 B1 | 1/2006 | Huang |
| 8,193,781 B2 | 6/2012 | Lin |
| 8,816,540 B2 | 8/2014 | Sun |
| 9,041,230 B2 | 5/2015 | Arnold |
| 9,231,461 B2 | 1/2016 | Kim |
| 9,484,795 B2 | 11/2016 | Moss et al. |
| 9,692,287 B2 | 6/2017 | Yamamoto |
| 9,942,663 B1 | 4/2018 | Salvatti |
| 10,418,890 B2 | 9/2019 | Kim |
| 2008/0074083 A1* | 3/2008 | Yarger ............... H02J 7/32 320/137 |
| 2011/0140577 A1* | 6/2011 | Galchev ............ H01L 41/00 310/22 |
| 2013/0033131 A1* | 2/2013 | Kahng ............... H02K 35/02 310/36 |

(Continued)

*Primary Examiner* — Viet P Nguyen
(74) *Attorney, Agent, or Firm* — Fishman Stewart PLLC

(57) ABSTRACT

A system and method to harvest vibration-based energy for generation of electrical power employs a magnet that travels vertically within an axial chamber between a set of upper and lower coils of magnet wire. The magnet is supported by a spring structure specifically selected to allow the magnet to travel freely and equally vertically relative to the coils allowing the capture of energy for the generation of electrical power on both the original movement of the magnet relative to the coil and on the return movement resulting from spring load on the magnet.

1 Claim, 6 Drawing Sheets

(56) References Cited

U.S. PATENT DOCUMENTS

| | | | | |
|---|---|---|---|---|
| 2013/0221768 A1* | 8/2013 | Kawarai | ............... | H02K 35/02 310/30 |
| 2015/0263589 A1* | 9/2015 | Castor | ................... | H02K 35/02 290/1 A |
| 2017/0198401 A1* | 7/2017 | Phillips | ................. | H02K 35/02 |

* cited by examiner $$P = \frac{(E_{TO} + E_{TI} + E_{BO} + E_{BI})^2}{4R}$$

$$P = \frac{(E_{TO} + E_{TI})^2 + (E_{BO} + E_{BI})^2}{2R}$$

VIBRATION-BASED ELECTRIC GENERATION DEVICE

RELATED APPLICATIONS

This application claims the benefit of priority based on previously filed U.S. Provisional Patent Application No. 63/101,722, filed May 12, 2020 for "Vibration Energy Generator", by Richard Lewis and Damon Kuhn, the entire disclosure of which is hereby incorporated by reference.

FIELD OF THE INVENTION

The present invention relates to the generation of electricity based on the capture and conversion of the energy present in mechanical vibrations. Mechanical vibrations present in motor vehicles have sufficient energy to provide efficient conversion to electricity and the present invention finds particular utility in the generation of electricity from mechanical vibration-based energy present in a moving motor vehicle.

BACKGROUND OF THE INVENTION

There have been numerous prior innovations related to the capture of mechanical energy from components having a relative linear motion and converting the energy to electrical energy. However, even though rotary-based generators have been extensively developed and great progress has been made in providing highly efficient rotary generators, this has not been the case for linear motion generators. The basic concepts have been long-known but detailed design advances have not kept pace with the advances made for rotary machines.

Regenerative suspension systems for automobiles have been employed to recapture energy previously lost in the use of vehicle shock absorbers. An example of such a system is disclosed in U.S. Pat. No. 6,952,060. The disclosed system is affixed to suspension components such that the relative motion of one component of the suspension system relative to another component of the system causes a mechanical force to drive an electric generating device for creation of electrical energy.

U.S. Pat. No. 5,347,186 for a Linear Motion Electric Power Generator dated Sep. 13, 1994 discloses a device described as a rare earth magnet and a coil positioned to move linearly back and forth relative to each other wherein the movement of the coil in the field of the magnet generates a current in the coil. Then, springless orientation means are provided to maintain a neutral position about which the relative motion occurs. Other approaches for capturing linear motion energy have been employed for linear motions associated with walking such as described in U.S. Pat. No. 4,239,974.

U.S. Pat. No. 9,692,287 discloses another structure for electrical generation based on mechanical motions being converted to electrical energy. In this arrangement coils are located adjacent a moving magnet.

The equation describing Faraday's Law of Induction ($E=-d\Phi D/dt$) is operative in the generation of electricity from the relative linear motion of two components, one being a magnet and the other being a wound coil. The minus sign is an indication of the direction of the induced electromotive force (emf) which is described by Lenz's Law ($E=-N\, d\Phi/dt$) and observed by using the "Left-Hand Rule" for the direction of the current flow in the coil. The induced emf is operative in the implementation and use of the present invention.

The change in magnetic flux ($d\Phi$) is a function of numerous factors, including the vibration applied to mechanical system, the mass of the magnet, m in grams, the Flux Density of the magnet, $\Phi$ in Gauss, the change in distance travelled by the magnet in each direction, $x=dy/dt$, the velocity of the magnet in each direction, $v=dx/dt$, the acceleration of the magnet in each direction, $a=dv/dt$, and the constant factor of the spring, k in g/cm; Hooke's Law, $F_S=kx$.

Samarium magnets are made as an alloy of Samarium (Sm) and Cobalt (Co); $SmCo_5$. While these are suitable for use in capturing linear motion and conversion of the energy to electrical energy, stronger magnets are preferred. Neodymium magnets are relatively stronger magnets and are made as an alloy of Neodymium (Nd), Iron (Fe) and Boron (B); $Nd_2Fe_{14}B$. They will corrode rapidly therefore, they are coated with three layers of different metals in the plating order; Nickel (Ni), Copper (Cu) and Nickel (Ni). The Magnetic Energy density for permanent magnets is stated in kilojoules per cubic meter.

1 Tesla (T)=10,000 Gauss (G) in Flux Density.

| Rating | Energy (kJ/m³) | Average Flux Density | |
|---|---|---|---|
| N30 | 235 | 11,050 G | 1.105 T |
| N33 | 259 | 11,500 G | 1.150 T |
| N35 | 283 | 12,100 G | 1.210 T |
| N38 | 306 | 12,600 G | 1.260 T |
| N40 | 318 | 12,850 G | 1.285 T |
| N42 | 334 | 13,150 G | 1.315 T |
| N45 | 350 | 13,500 G | 1.350 T |
| N48 | 374 | 14,000 G | 1.400 T |
| N50 | 390 | 14,250 G | 1.425 T |
| N52 | 406 | 14,500 G | 1.450 T |
| N55 | 430 | 14,900 G | 1.490 T |

The prior disclosures of technologies, systems, and methods of converting mechanical energy to electrical energy show that it is possible to capture energy from vibrations on vehicles to power small electronics or charge the vehicle battery. The mathematics they describe provide a foundation for the implementation and use of the present invention. Similarly, the basic principles disclosed therein can be used to make and to use the energy conversion embodiments according to the present invention. The present invention relates to the design and manufacture of a vibration-based electric generation device or module to supplement energy generation within vehicles, manufacturing facilities and other power harvesting applications. The present invention provides a significant advance in the practical implementation of these previously known principles to recapture of otherwise lost energy in electric road vehicles, and may be of value in other applications where substantial vertical vibrations are present.

SUMMARY OF INVENTION

As electric motor vehicles have become more popular it has become evident that the range of these vehicles is somewhat less than is generally acceptable to most consumers. Contributing to this consideration is the fact that electric charging stations for electric vehicles are not widely available posing risks of not being able to complete a trip without a lengthy stop for battery recharge. As a result, there is a need to make electric vehicles as efficient as possible. One way of accomplishing this objective is to minimize otherwise wasted energy. In an effort to minimize the waste of energy it is possible 2 make each device as efficient as possible, but it is also possible to provide mechanisms that can recapture the energy that would otherwise be lost. An example of a widely available energy recapture system can be seen in regenerative braking. Similarly, as described above, it is possible to have a vehicle suspension system that recaptures some of the energy that would otherwise be lost in a friction-based shock absorber system. The present invention advances the energy recapture opportunities in a road vehicle by providing a mechanism that recaptures the energy that would otherwise be lost to vertical acceleration and deceleration of the road vehicle platform.

In an energy conversion device according to a desired implementation of the present invention, a structure is provided such that when the structure is exposed to sufficient vertical acceleration such as is consistently present in the form of vibrations in a moving road vehicle, energy is recaptured. To accomplish this, a rare earth permanent magnet is suspended by a spring structure that travels vertically (relative to a coil) along a linear path having an axis that passes through the center of the coil. The relative movement of the permanent magnet (relative to the coil) creates an induced current in the coil, the fundamental aspect of electrical generation. In a more detailed implementation of the invention, the magnet is positioned such that it has relative movement vertically along an axis that passes through the center of each of an upper coil of magnet wire and a lower coil of magnet wire.

It has been found that the needs of electric vehicles are continuing to evolve and that ever increasing efficiencies are required to meet higher expectations for generator performance. Thus, prior generator systems have been found insufficient to meet evolving needs for lighter and more powerful electrical generators. As electric vehicles are adopted in greater numbers, the competitive nature of the industry demands greater vehicle range between recharges. Thus, generator systems that can capture the energy in moving electric vehicles that would otherwise be entirely lost are of increased importance. The present invention addresses this need.

By providing wound coils at each end of a central channel and confining a permanent magnet within the channel—allowing vertical movement only—improved energy capture from a given amount of vertical energy input can be achieved. These higher efficiencies can be achieved relative to prior systems that employed a magnet moving relative to a single wound coil and relative to systems that employed coils adjacent (rather than surrounding) the axis along which the magnet moves relative to the coils. In a still more refined embodiment of the invention there is additionally provided an upper inner coil and a lower inner coil proximate the upper coil and lower coil respectively. Providing the additional inner coils (coils that are inside the channel rather than surrounding the channel structure) increases the efficiency of the power generation device and allows for capture of a greater portion of the energy imparted to the system by externally occurring vibrations. The magnet is preferably supported by a spring system allowing the magnet to travel freely and equally vertically. The spring system may employ one spring from which the magnet is suspended, or the magnet system may include two springs, one above and one below the magnet, providing either compression or tension of the springs to retain the magnet in the desired central location at equilibrium, but allowing spring movement upon acceleration of the energy conversion device. The concept takes advantage of Faraday's Law so that when either pole of a magnet is in motion that either approaches a coil of wire or is retracting away from it, the magnetic lines of force extending outward from the magnet's poles will intersect the coil wiring, either perpendicularly or at an angle greater than zero, thereby creating an electric current flow in the coil. The pole (North or South) and the direction of the magnet travel determines the direction of the current flow. Reversing either the pole or the direction of movement of the magnet will reverse the direction of the induced current.

Because the vibrations applied to the magnet and coils during vehicle road travel are effectively random (the consequence of the vehicle travelling along a roadway with seemingly random surface imperfections), the magnet will, relative to the coils, change its direction, velocity, and acceleration parameters as rapidly as the road surface variations dictate, seemingly at random. Hence the energy output from the coils has a random-like appearance potentially including a combination of different waveforms such as sine, triangular, square, sawtooth, pulse, and simple noise spikes both with positive and negative voltages. Through the use of suitable circuitry, the output from the coils can be converted to useful electrical energy.

A way to utilize the energy output of the coils with all these random waveforms is to first invert all the negative voltages to positive values by using a bridge rectifier that may be mounted on a printed circuit board (PCB). Then, a capacitor can level out the changing positive voltages to a more averaged and level output of energy, basically a DC voltage. A housing for the generator provides for mounting of the structure to any mechanism that is exposed to vertical accelerations. The preferred application is on an electric road vehicle, and more particularly on an unsprung location such as the vehicle corner assembly.

It is an object of the present invention to provide a generator with improved efficiency for converting vertical accelerations into electrical energy for extending the range of an electric road vehicle.

It is another object of the invention to provide a generator that additionally contributes to the suppression of vibrations within the passenger compartment of an electric road vehicle to aid in passenger comfort.

It is yet another object of the invention to provide a lightweight electric generator for use in an electric vehicle.

DETAILED DESCRIPTION OF THE INVENTION

Figure 1:
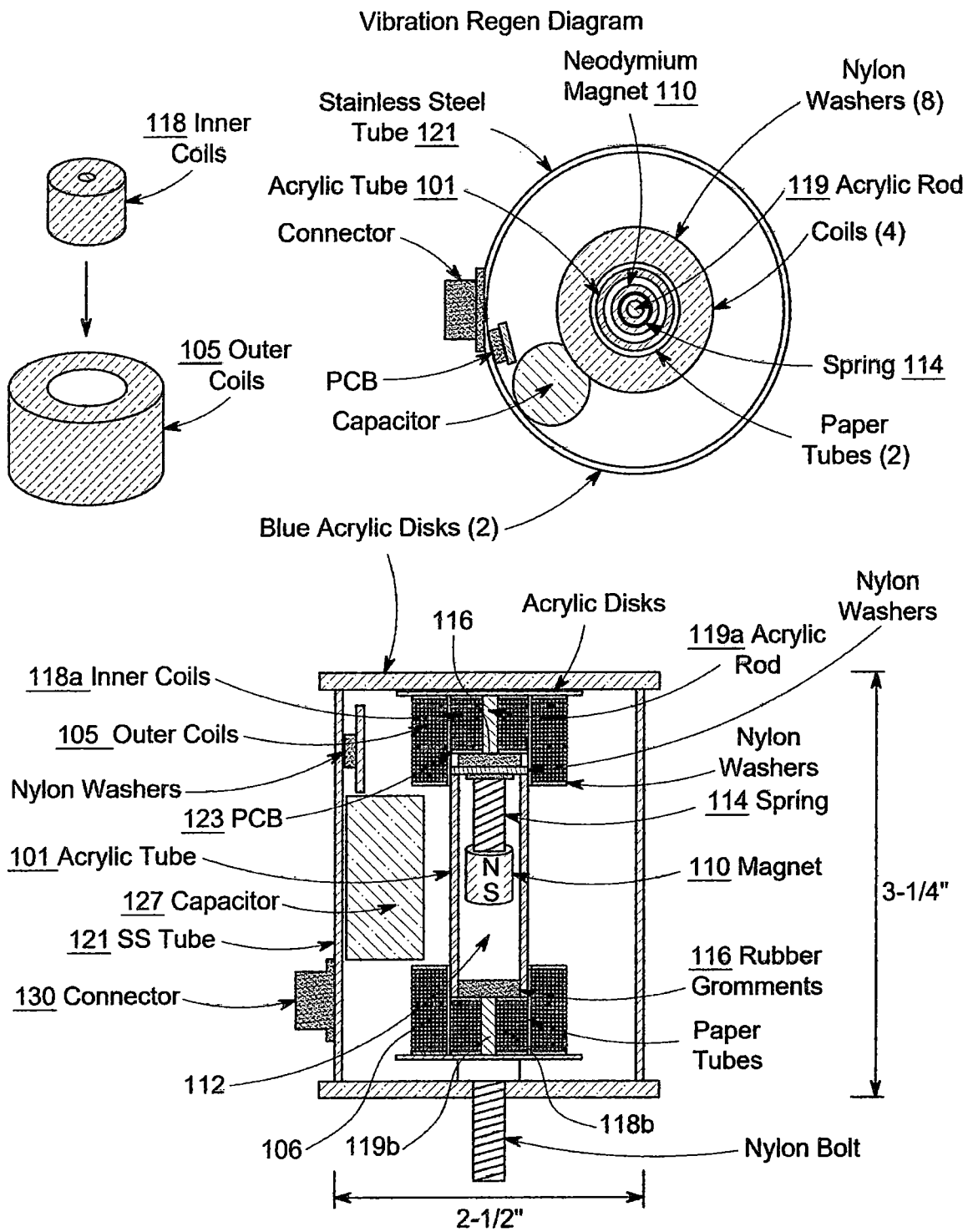
FIG. 1 is an illustration of the magnet and coil structure of a first implementation of the invention.
Figure 7:
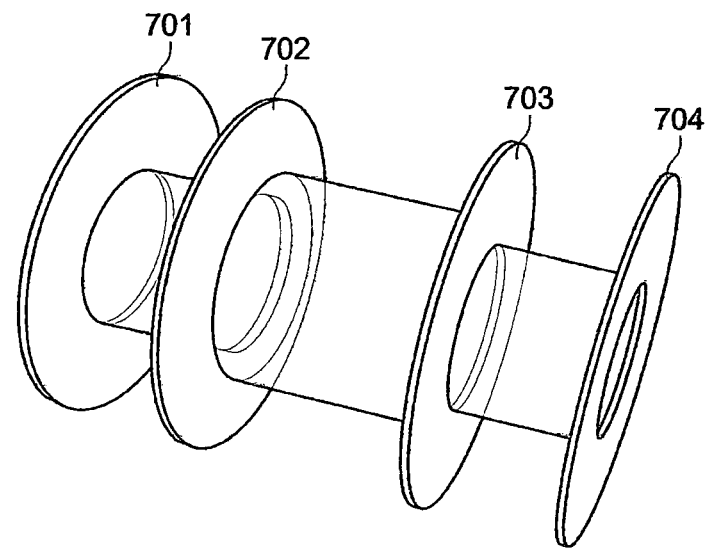
FIG. 7 illustrates the central bobbin in a preferred embodiment of the invention.

A diagram of an implementation of the invention is shown in FIG. 1 where an acrylic tube 101 is vertically oriented. The tube, illustrated in more detail in FIG. 7, includes an upper set of winding guides 701,702 and a lower set of winding guides 703,704. Outer coil 105 is created by winding 10,000 or more loops of wire, preferably 32 gauge or smaller, around tube 101 near the upper end of the tube, between winding guides 701 and 702. In similar fashion, lower coil 106 (the coil being located at the opposing end of tube 101) is wound around the tube 101 within the coil winding guide defined by guides 703 and 704. A magnet 110 is supported by a spring structure 114 within the axial chamber 112 defined by tube 101. The spring structure illustrated for support for the magnet is provided by a spring 114 having a spring constant matched to the mass of the spring so that the spring is supported in equilibrium roughly halfway between coils 105 and 106. The length and strength of the spring are selected so that the magnet can move vertically within tube 101 far enough for the upper end of magnet 110 to enter the upper portion of tube 101 that is within coil 105. However, to avoid the magnet from extending more than halfway into the coil, a rubber grommet 116 serves as a bumper at each of the upper and lower limits of travel for the magnet within the tube. This bumper prevents the magnet from passing too far into the coil, which would result in generation of a reverse current in the coil, having a detrimental impact on electrical generation. The bumpers also prevent damage to the magnet and inner coils 118$a$ and 118$b$. Providing a slight taper to at least an end portion of the bumpers can assist in providing cushioning of any impact of the magnet against the bumper.

Figure 2:
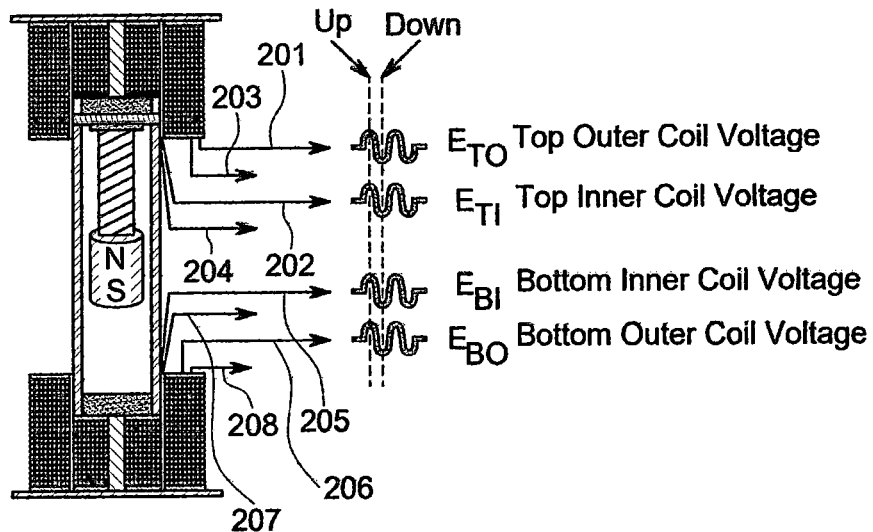
FIG. 2 is an illustration showing the wires connected to the coils in an embodiment of the invention.
Figure 3:
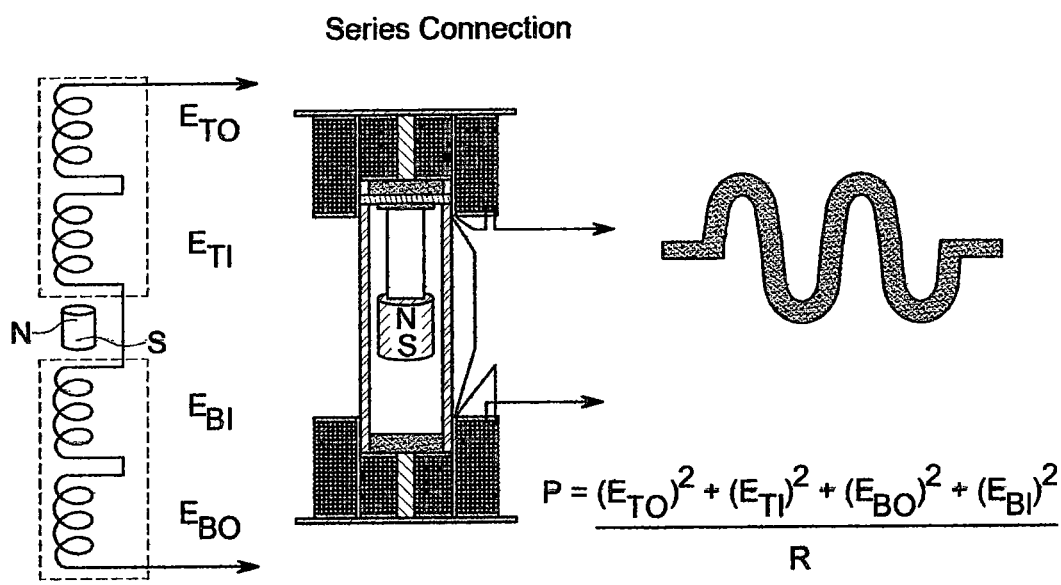
FIGS. 3-5 illustrate electrical connections for alternative constructs of a preferred embodiment of the invention.
Figure 4:
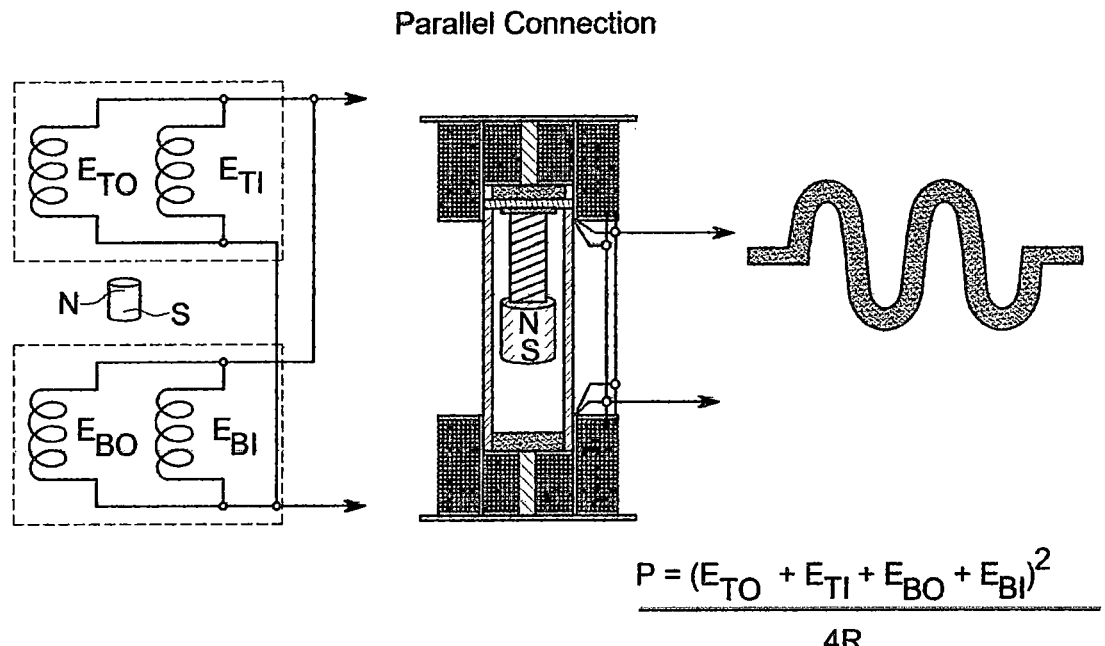
Figure 5:
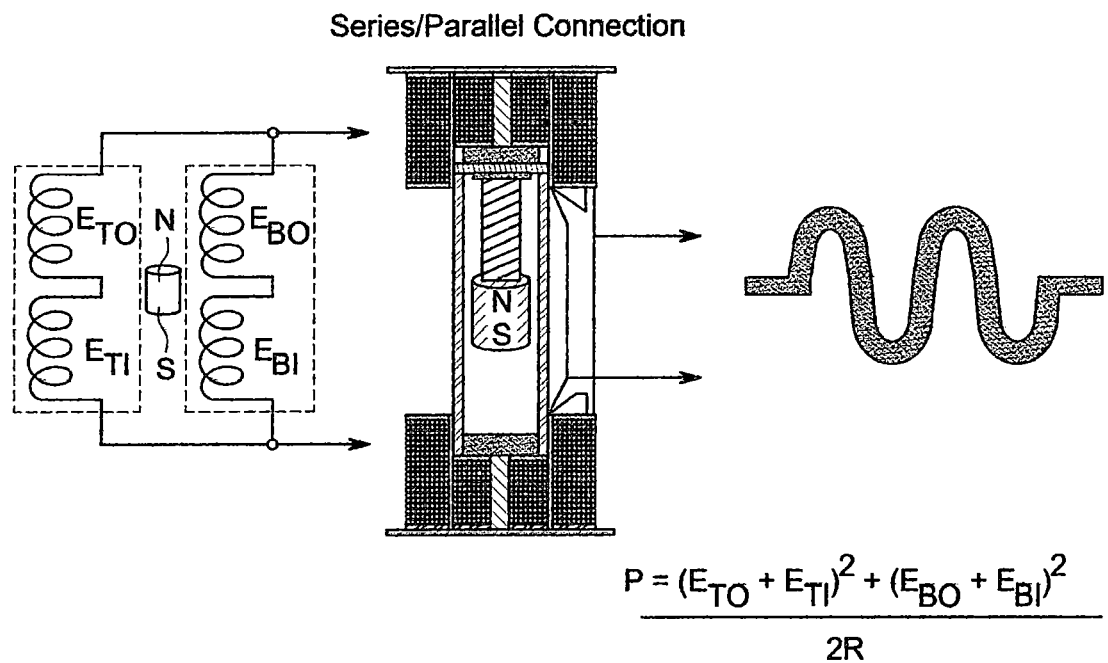

Inner coils 118$a$ and 118$b$ are wound around respective acrylic posts 119$a$ and 119$b$ at the top and bottom respectively of the axial channel 112 sufficiently close to the ends of the channel that they are not interfering with the magnet's range of motion. The windings in coils 118$a$ and 118$b$ are oriented so that the currents generated in these coils supplement the currents generated in the outer coils 105,106. This embodiment of the invention takes advantage of a high number of windings around the channel as well as taking advantage of four coils, all for the purpose of capturing the highest possible portion of the vibration-based energy. However, in situations where the vibrations are more extensive, this design could be exposed to higher currents than are suitable for the thin winding wires. The alternative design shown in FIG. 6 would be more suitable for these more aggressive environments, FIG. 2 shows the electrical connection of the coils demonstrating that when the magnet moves toward the upper coils 105, 118$a$ that current flow from leads 201 and 202. Additionally, when the magnet moves away from the lower coils 106,118$b$ current flows from leads 205 and 208. Thus, for vertically upward movement of the magnet 110 each of the four coils 105, 106, 118$a$ and 118$b$ generates current that can be directed to the rectifying circuitry 123, illustrated in FIG. 1 as a bridge rectifier mounted on a printed circuit board. The output of the bridge rectifier is directed to the capacitor 127 for accumulation of the dc energy and smoothing of the dc current and voltage that is provided to output port 130. Depending upon the specifications for the system that will be using the power provided by the generator, the voltage and current output from the system can be selectively tailored by providing parallel, series or a mixture of parallel and series connections, as illustrated in FIGS. 3 through 5. With these variations, the output current or the output voltage can be increased relative to alternatives, for optimization of the overall system performance.

Figure 6:
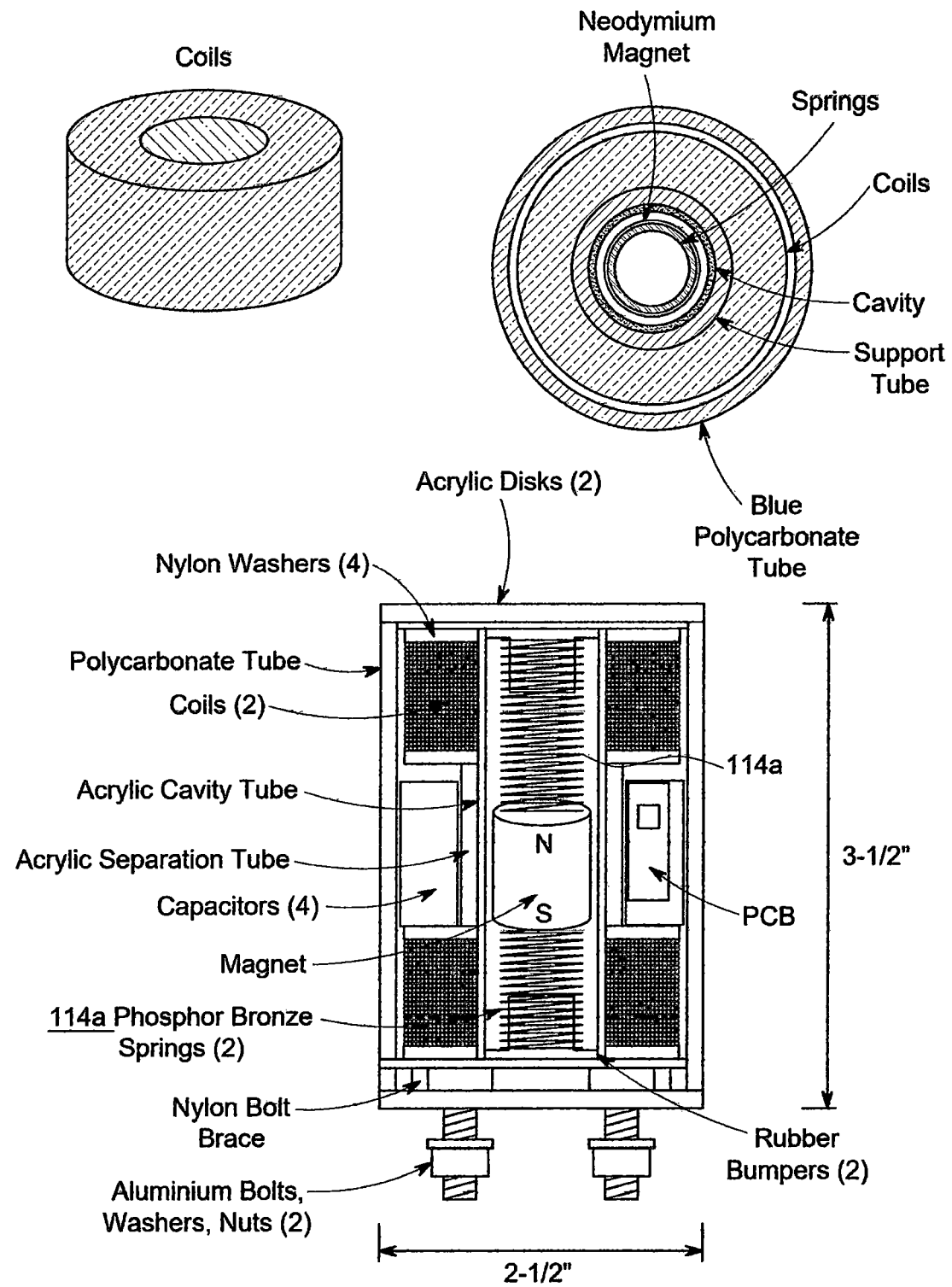
FIG. 6 illustrates another embodiment of the invention.
Figure 9:
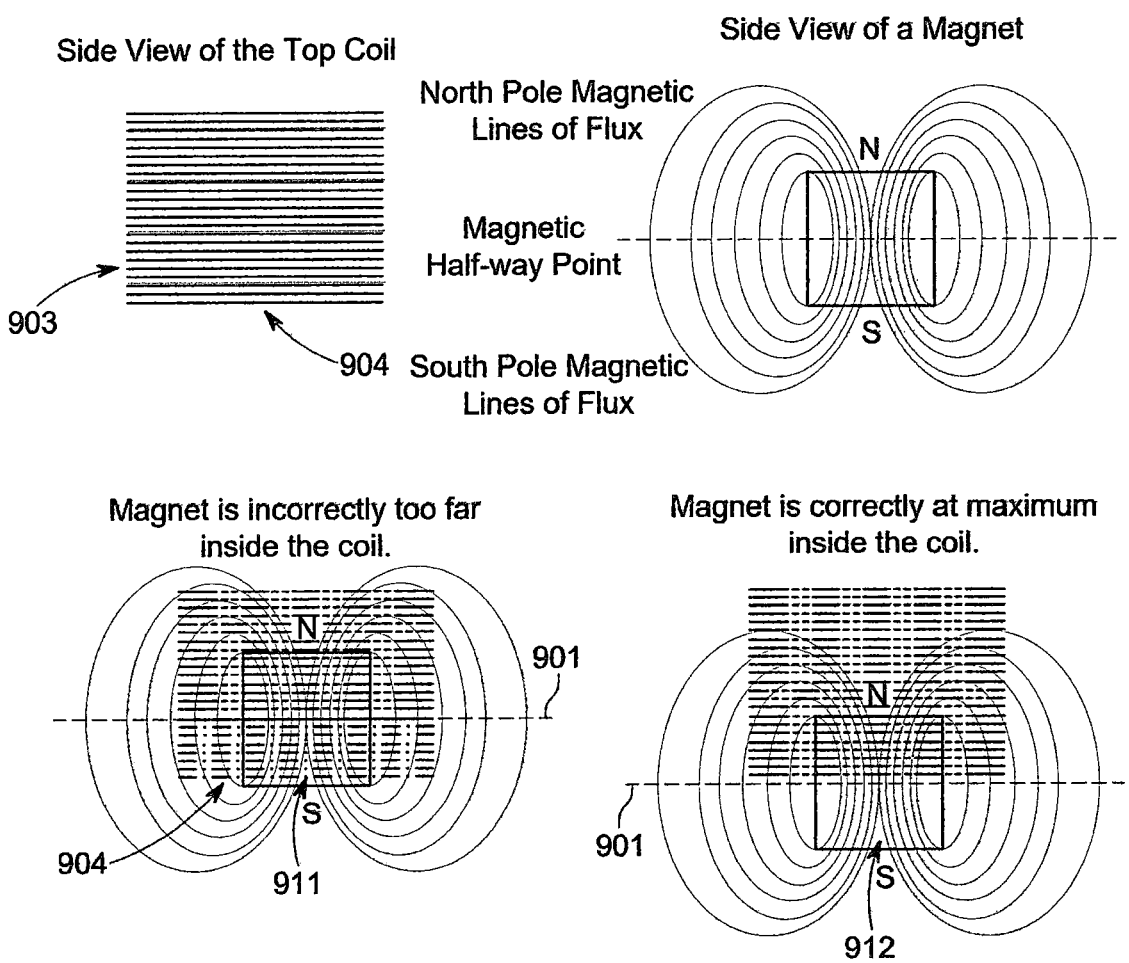
FIG. 9 illustrates the positioning of the magnet used in implementation of the invention relative to the windings of the coils.

Another embodiment of the invention is illustrated in FIG. 6 where an upper coil 105 and a lower coil 106 are wound around the acrylic support tube 101. Tube 101 has a length of approximately 3" to 3¼" and an inner diameter of roughly ¾". The upper coil windings cover roughly 25% of the length of the support tube and include roughly 6,000 windings of a 30 gauge wire. In a preferred implementation of this embodiment of the invention, provision of 6,000 windings or more has been found effective for providing efficient conversion of the axial movements into a suitable electrical output. Similarly, lower coil 106 has matched windings, but is wound in the opposite direction to facilitate matched voltage polarity and currents with the upper coil during use. Magnet 110 is a cylindrical magnet measuring about ¾" long and having a diameter of about ¾" supported by spring structure 114$a$,114$b$. The magnet illustrated is an N52 magnet and has a mass of about 40 grams. In practice the magnets strength is preferably 1.45 T or greater. Upper spring 114$a$ has a first spring constant that is weaker than the spring constant of lower spring 114$b$. Both springs are in compression so as to avoid any situation where the springs (one or both) are slack potentially resulting in excessive wobble of the magnet in the axial channel. At rest, in a state of equilibrium, the upward force from spring 114$b$ is greater than the downward force provided by spring 114$a$, the difference being equal to the mass of the magnet, with a slight difference associated with the weight of the springs themselves. To implement this desired condition, the spring constant of the lower spring is greater than the spring constant of the upper spring. Additionally, the lower spring is preferably slightly longer than the upper spring such that they are of roughly equal length when in equilibrium. The slight additional compression of the lower spring due to the weight of the magnet and springs is compensated for by the extra length and higher spring constant. In a preferred embodiment, the length of the springs is sufficient that they each remain in some state of compression regardless of the extent to which the magnet moves along the length of the axial channel—all the way to the end of travel established by the bumpers. Phosphor-bronze springs are well suited to this application, although other non-magnetic materials could be employed. In this embodiment, the bumpers are radially inside of the springs and have a length long enough to prevent the spring from being fully compressed against itself, and thus to prevent any slamming of the magnet against the spring in a hard stop. This protects the magnet, but also serves another function—preventing the magnet from entering the coil beyond the point where there is a current reversal. Thus, the center of the magnet is restricted from moving past the entry point of the coil. FIG. 9 illustrates the significance of keeping the magnets from moving too far into the coil, and thus the importance of the bumpers. While there is still some benefit in the generation of current when the magnet center point 901 has entered the coil (provided it does not pass the mid-point 905 of the coil), the amount of energy converted to electricity is reduced relative to what would be generated if the magnet had not been allowed to excessively enter the coil. The bumpers stop the magnets from entering the coil to an extend beyond which the midpoint of the magnet reaches the effective entry 903 into the coil. The effective entry 903 is the point roughly aligned with the edge 904 of the windings. FIG. 9 illustrates a side view of one coil, an upper coil, and a side view of a magnet with exemplary lines of magnetic flux around the magnet, generally centered with respect to the north and south poles of the magnet. FIG. 9 additionally shows a magnet 911 that is located beyond the optimum depth inside the coil and illustrates a magnet 912 that is correctly at the maximum desired extension inside the coil. For assuring that the magnets extend only the optimum depth inside the coil, the bumpers could be located radially outside of the springs (but still inside the axial chamber) and would still perform their intended purposes. The bumpers' purpose is not limited to the electrical considerations but is two-fold. The first aspect of the bumper function is to prevent the magnet from slamming into the fully compressed springs thereby creating eventual damage to the springs, and the second purpose of the bumpers is to prevent the magnet from entering into each winding segment further than its halfway point for purposes of optimizing the energy conversion to electricity. The limitation of movement of the magnet is preferably applicable in both the upward and downward directions so the bumpers serve the function of preventing the midpoint of said magnet from entering said first and second coils.

In this embodiment, there are provided multiple capacitors which combine to provide the capacitance necessary for handling the output from the bridge rectifier. Employing multiple capacitors allows a more compact layout of components within the housing, permitting the overall system to have relatively lower weight and size, both advantages in the design of road vehicles.

For overall system design, optimized system components will provide system performance that meets consumer considerations, particularly with respect to the system cost versus the system value. To meet this important objective, many of the component specifications need to be selected based on factors other than pure technical optimization. The following system parameters have been selected based on the combined considerations of cost, performance and perceived value.

The magnet is a permanent rare earth magnet. The magnetic flux density of the magnet should be not less than N52 grade for efficient implementation of the preferred embodiments of the invention. Magnets rated at or above 1.45 T are preferred. The magnet employed in a first embodiment of the invention is a cylinder shape magnet measuring ⅜" in diameter by ⅜" long weighing 6 grams. This is effective for applications where relatively small and relatively higher frequency vibrations will be encountered and the amount of energy to be recaptured is consistent with relatively non-aggressive roadway conditions. The magnet employed in the second embodiment is ¾" in diameter and about ¾" long, weighing about 40 grams. This heavier magnet is suitable for use in heavier vehicles, and in applications where more aggressive driving conditions will be encountered. In practice, it is proposed to include at least one system having a magnet of a first selected weight for capture of vibrations in a first frequency range and to additionally include a second system having a magnet of a second, heavier, weight for capture of vibrations at a second frequency range. This will allow energy recapture across a broad range of driving conditions.

The spring is a non-magnetic spiral of stiff wire and is attached to the magnet in opposition to gravity where it determines the rebounding distance, velocity, and acceleration of the magnet in motion. The spring should have a "spring rate" equal to or relatively near equal to the mass of the magnet for its optimal range of motion. Note that the Constant Factor of the spring to be used is desirably very close to the mass of the magnet in order to have an equilibrium type of bouncing. In order to provide more consistency in keeping the magnet centered within the coils, two springs can be employed, one above and one below the magnet. The springs could be either in tension or in compression, always keeping the combined strength of the springs balanced with the weight of the magnet so the magnet tends to remain centered between the coils when in equilibrium. Keeping both springs in compression provides the best performance, particularly in terms of avoiding excessive wobble or bouncing of the magnet during use.

The chamber is a non-magnetic tube where both the magnet and spring operate inside. It has a length slightly longer than the optimal range of motion of the magnet and spring with a diameter slightly larger than either diameters of the magnet or the spring. The chamber keeps the magnet in a singular dimensional vertical motion with as little side friction as possible. The magnet may be coated with a low-friction coating to facilitate long operating life and to avoid internal friction that degrades power generation from the system. Coating the interior of the axial channel is also possible, either as an alternative to coating the magnet or in addition to coating the magnet. The most cost effective approach involves coating only the magnet while the highest performance approach involves coating both the magnet and the interior of the tube.

The coils are made of any electrically conductive wire insulated by an outside covering. The wire is wound on a spool to create a toroidal coil that is used to convert magnetic energy into electrical energy. In the preferred embodiments of the invention, a coil is created at each end of the chamber. The use of wire in the range of 30 gauge to 36 gauge has been found desirable for purposes of achieving sufficient power output without unduly increasing the weight of the system. Smaller wire, such as 36 gauge, has been found to be effective and the use of even smaller wire would be even more beneficial in the management of system weight for applications where extreme driving conditions will not be encountered and where vehicle weight is of major importance.

The electronics are comprised of two conceptual components; a Bridge Rectifier and a Capacitor. The bridge rectifier converts all the negative values of electrical current generated by the coils into positive values and adds them to the other existing positive values being generated. The capacitor, after it has been charged up by those changing positive values, then adds to those changing positive values creating a constant voltage output, basically Direct Current. Of course, conversion to all negative voltages would provide a similar dc basis for capturing the generated energy. For management of the system's physical size, it has been found desirable to employ multiple smaller capacitors in parallel instead of using a single large capacitor. The multiple smaller capacitors can be placed within the housing in an efficient physical arrangement that is not feasible with a large single capacitor. In a system designed for a passenger vehicle it has been found suitable to use a total capacitance of between about 1,000 and 1,500 uF.

The shield is any magnetically conductive tubing used as a case to surround the magnet in motion insulating it from any effects from other magnets or other magnetically conductive materials outside. This feature is beneficial for systems where the amount of energy to be captured is small and the vehicle involved is large, but for larger energy capture systems and for smaller road vehicles, the added weight of the shield is a negative consideration that might outweigh the added efficiency.

The coils will generate electrical energy when a changing magnetic flux is impacted upon them perpendicularly or at any angle greater than zero. The magnet provides the magnetic flux needed and when in motion it creates that flux change upon the coils. The spring and chamber effectively allow, and restricts, the magnet to travel in a linear motion toward each end of the chamber where the coils are impacted by the magnetic flux. The coils convert the magnetic energy into electricity as noted by Faraday's Law of Induction. The electronics then converts all the random changing values of electricity by the coils into a positive DC. It is this DC electricity that is captured to use as a supplemental source of energy.

The coils for creating the electromotive force from a moving magnet for this implementation of the invention preferably contacts as many magnetic lines of force as possible. So, not only do we want to use an extremely strong magnet with a high magnetic flux density, but to have a number of "turns" of wire to generate the approximate same voltage from each coil. Also, having four coils, as in the embodiment of FIG. 1, allows for connection in different configurations; in series, or in parallel, or both (as illustrated in FIGS. 3-5) that will generate nearly 4 times the output power of a single coil. The chamber is created from a clear acrylic tube or other non-magnetic material that will allow the magnet to easily slide up and down internally and in an implementation with 30-gauge or smaller magnet wire wound on each end creating one or more toroid coils. In a preferred embodiment, four toroid coils will be created. The number of turns of wire for each coil will basically be the same to generate nearly equal voltages between them and there are as many turns each as needed to generate the desired voltage and current. Improved performance can be derived through the use of smaller wire as it allows more turns of wire yielding a higher voltage and therefore, more output power, within the same coil volume. Use of 36 gauge or smaller wire is preferred for higher voltages, as is the use of N55 or stronger magnets. However, in some applications where extreme vibrations are encountered, such as with a badly out of balance tire or driving over particularly rough road conditions, it is possible that the voltages generated will be sufficiently high with fewer turns on the coil. In such situations, an aggressive vibration would create such high voltages that the currents reach the limits of what can be handled by very small winding wires. In these situations, larger wire (roughly 30 gauge) will be more suitable, particularly if strong magnets (above N52) are employed.

FIG. 3 shows a connection where all four coils are connected in series with each other. The purpose of this type of connection is to quadruple the voltage output but keeping the current for each coil the same. This configuration would be suitable for somewhat rough driving conditions.

FIG. 4 shows a connection where all four coils are connected in parallel with each other. The purpose of this type of connection is to quadruple the current output but keeping the voltage for each coil the same. This configuration would be suitable for situations where the vibration energy is not particularly high.

FIG. 5 shows a connection where the top two coils are connected in series with each other and the bottom two coils are connected in series with each other, but the top and bottom coil networks are connected in parallel with each other. The purpose of this type of connection is to double the voltage outputs and double the current outputs.

The preferred embodiment for a small electric vehicle where the system is properly tailored for the vehicle would be as illustrated in FIG. 5. For a desirable level of performance in a commercial application, the provision of the inner coils can be omitted, resulting in a simple series connection of the upper and lower coils in the embodiment shown in FIG. 6. The two coils shown in FIG. 6 could also be connected in parallel if desired to keep the voltage to half of the series-connected voltage and to keep the current relatively higher.

Figure 8:
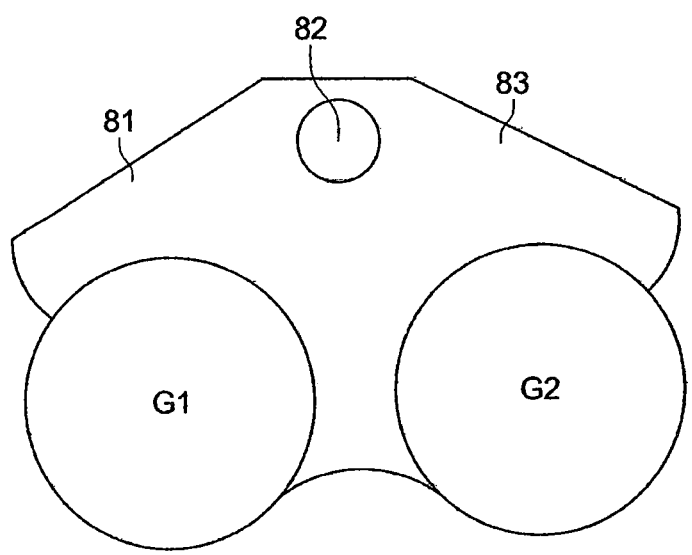
FIG. 8 illustrates a multi-generator implementation of the invention

The application of the invention to commercial applications is expected to involve modification of the examples provided for the purpose of sizing the generator structure for both physical fit and for achieving the desired electrical generation capacity. For instance, it is within the scope of the invention to include multiple generation devices on a typical road vehicle, such as including generation capabilities at each corner of the vehicle. Further, it is valuable to include multiple generators at an individual vehicle corner, with different frequency performances in order to capture energy from vibrations of differing frequencies. It is also valuable to include a single mounting housing 81 as illustrated in FIG. 8 for the multiple generators G1 and G2 located at a single mounting location to facilitate vehicle manufacturing and assembly. Providing more than 2 generator units at a single vehicle corner will allow for efficient energy collection at more than 2 effective vibration energy absorption ranges. One or more mounting brackets 83 having bores 82 therethrough for easy bolt-on installation is preferred at each vehicle corner. The housing can be connected to an unsprung element of the road vehicle and when so connected it will aid in damping the road vibrations that reach the passenger compartment. In this mounting configuration there will be very substantial vibrations and the amount of energy that can be generated will be substantial. However, adding to unsprung mass of a vehicle adds an additional burden to the vehicle primary suspension system. With the present invention, the amount of energy recovered more than compensates for the additional burden on the suspension system. In another arrangement, the housing can be connected to a sprung element of the vehicle and in this implementation there is no inherent contribution to the detrimental load on the primary suspension system. However, there is still an incremental improvement in the ride and comfort of the vehicle. The energy recovered by the generator system directly reduces the vibration energy remaining in the vehicle chassis. An example of a situation where this is very noticeable for improving vehicle comfort arises when a tire is out of balance. The rapid vibration caused by the out of balance tire will cause a significant vibration of the housing which will be transferred to the coil system. This vibration of the coils will create relative movement of the magnets relative to the coils and will result in generation of electricity. The energy extracted for electrical generation will directly be removed from the remaining vibration energy of the vehicle, thus smoothing the ride.

When the generator unit is to be connected to an unsprung component of the vehicle, it is desirable to keep the mass of the generator below 2.5 Kg so as to avoid excessive contributions to a rough ride. Keeping the total mass between 1.0 and 2.5 Kg is desirable.

While the present invention has been described herein with reference to various embodiments, and with respect to specific components and specifications for the components used in these preferred embodiments, it is to be understood that the invention is not limited to these embodiments.

The invention claimed is:

1. In an electric vehicle, a generator comprising a housing of nonmagnetic material mounted to an unsprung portion of said electric vehicle, said housing containing a vertically oriented channel structure of nonmagnetic material defining an axial channel having opposed ends, first and second coil windings around opposing end portions of said axial channel, a third and a fourth coil winding proximate and inside of said opposing end portions of said axial channel and a magnet having an axial midpoint, said magnet being supported within said axial channel between said opposing ends by a spring system and including bumpers inside of and located at each end of said axial channel to limit the range of axial movement of said magnet within said axial channel for avoidance of collision of said magnet with said third and fourth coil windings and further preventing the midpoint of said magnet from entering said first and second coils, said generator comprising a rectifier circuit within said housing and said housing having a power outlet for transfer of dc electrical power from said generator.

\* \* \* \* \*